No. 626,765. Patented June 13, 1899.
W. W. NEWBERRY.
INSECT POWDER GUN.
(Application filed Oct. 10, 1898.)
(No Model.)
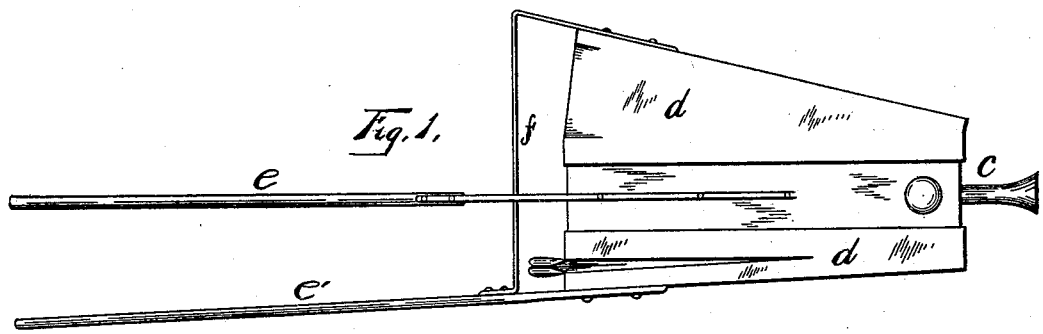
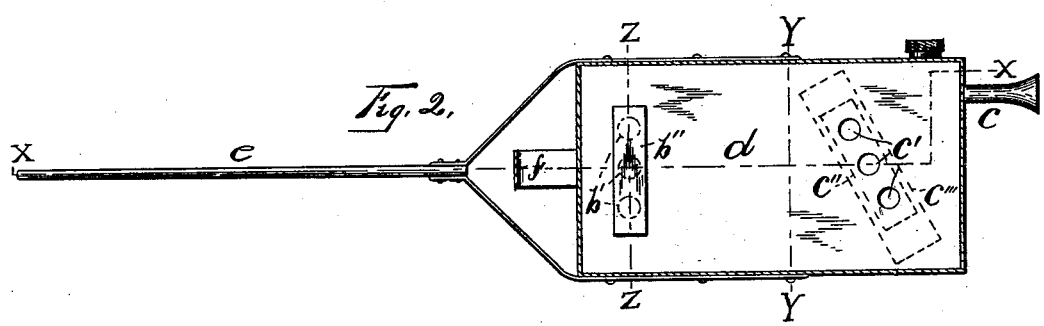
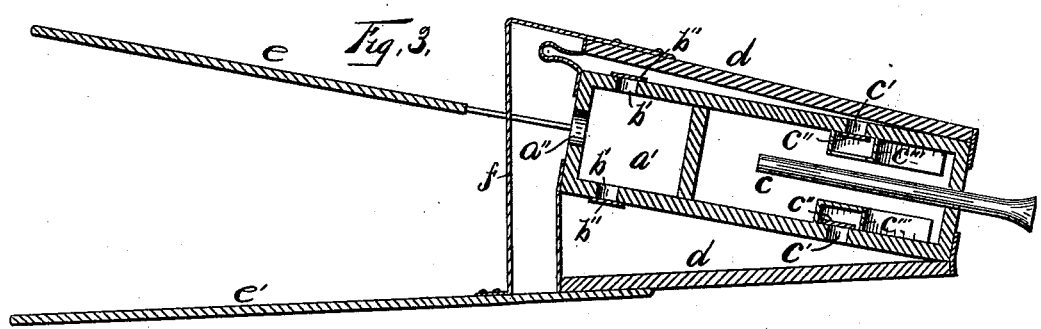
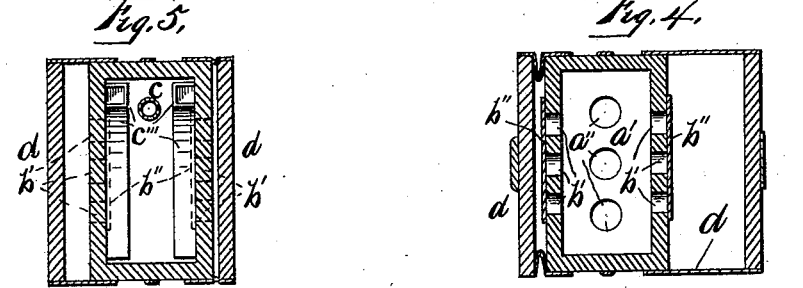
WITNESSES:
Ch. Schoeneck
M. A. Franklin
INVENTOR
William W. Newberry
BY
Smith & Denison
ATTORNEYS.

UNITED STATES PATENT OFFICE.

WILLIAM W. NEWBERRY, OF POLAND, NEW YORK.

INSECT-POWDER GUN.

SPECIFICATION forming part of Letters Patent No. 626,765, dated June 13, 1899.

Application filed October 10, 1898. Serial No. 693,095. (No model.)

*To all whom it may concern:*

Be it known that I, WILLIAM W. NEWBERRY, of Poland, in the county of Herkimer, in the State of New York, have invented new and useful Improvements in Insect-Powder Guns, of which the following, taken in connection with the accompanying drawings, is a full, clear, and exact description.

This invention relates to insect-guns or devices for distributing insect-powder upon vines infected with insects.

My object is to construct such a device for producing a continuous flow of insect-powder upon potato-vines or vines of other vegetables, cheap and durable in its construction, and of great utility; and to that end my invention consists in the several new and novel features of construction and operation hereinafter described and which are specifically set forth in the claims hereunto annexed. It is constructed as follows, reference being had to the accompanying drawings, in which—

Figure 1 is a top plan view of the device complete, showing the bellows upon one side extended. Fig. 2 is a side view of the air and insect-powder chambers and showing the valve and shell in dotted lines in the insect-powder chamber. Fig. 3 is a cross-section on line $x\ x$, Fig. 2. Fig. 4 is a cross-section on line $z\ z$, Fig. 2. Fig. 5 is a cross-section on line $y\ y$, Fig. 2.

Similar letters of reference indicate corresponding parts.

My device comprises, preferably, a rectangular box having a partition $a$, forming chambers $a'$ and $b$, the chamber $a'$ having openings $a''$ upon the rear end and openings $b'$ upon the sides, the outer ends of which openings are covered by a valve $b''$, said valves consisting, preferably, of a piece of leather or similar flexible material fastened over them at the ends, the portion between the ends being loose, so as to allow the air to pass through the openings outwardly, but prevent the reverse movement.

The powder-chamber $b$ is provided with an adjustable tube $c$, adapted to be adjusted with respect to its length in the front end of the chamber, the front end of said tube preferably being enlarged in size, so as to readily distribute the dust by the action of the air under compression.

The insect-powder chamber $b$ is provided with lateral openings $c'$, having upon their inner ends valves $c''$, which may be of rubber or leather, and $c'''$ is a shell inclosing said openings $c'$ and valve $c''$, having an opening at its lower end, so as to allow the air passing through the opening $c'$ to pass down and agitate the powder in the bottom of the powder-chamber—agitate it so as to produce an even stream of powder. It will also be observed that by forcing a positive current of air down to the bottom where the powder lies I am able to exhaust the entire supply.

The openings $c$ in the insect-powder chamber are constructed in a line, as shown in Fig. 2, which would form an oblique angle to the front end of the gun. This is for the purpose of allowing the air when it comes in to agitate the powder in the front lower corner of the insect-powder chamber, as indicated by the dotted lines, and stir it up, so as to produce a fine dust, which will pass out of the tube $c$ upon the vines to be treated.

Upon each side of the air and insect-powder chambers I construct a pair of bellows, as shown at $d$, and provide the air and insect-powder chambers with a stationary handle $e$. One of the bellows I provide with a handle $e'$ and connect it by a rod $f$ to the other bellows, so that by taking the handle $e$ in one hand and operating the handle $e'$ I alternately operate the bellows. It will thus be seen that when the bellows are being operated the air will enter the openings $a''$ into the air-chamber $a'$ and pass out into the bellows through the openings $b'$, according to the one which is operated, and from thence through the openings $c'$ into the insect-powder chamber $b$, where the air under compression agitates the powder, produces a fine dust, and forces it out through the tube $c$. It will also be observed that the two bellows will produce a continuous flow of insect dust or powder, and thereby utilize all of the power which is applied.

Having described my invention, what I claim, and desire to secure by Letters Patent, is—

1. An insect-gun, comprising an air-chamber, having inlet-openings, exits guarded by valves, an insect-powder chamber having inlets guarded by valves, and a dust or powder exit chute, and bellows upon either side of said air and powder chambers, for the purposes specified.

2. In an insect-gun, a powder-chamber, having one or more valve-openings, shells inclosing the same, having openings at their lower end for the purpose of conducting the air to the bottom of the powder-chamber, for the purposes set forth.

3. An insect-gun, comprising an air-chamber and powder-chamber, an air-inlet to the air-chamber, and exit-chambers guarded by valves, the powder-chamber having a dust-exit, and air-inlets guarded by valves, bellows upon either side of said chambers, a handle secured to said chambers, and a handle upon one of the bellows connected to the other bellows, so that by operating one of the bellows, the other bellows is alternately operated.

In witness whereof I have hereunto set my hand this 27th day of September, 1898.

WILLIAM W. NEWBERRY.

Witnesses:
M. A. FRANKLIN,
HOWARD P. DENISON.